United States Patent
Oouchi et al.

(10) Patent No.: US 10,429,404 B2
(45) Date of Patent: Oct. 1, 2019

(54) ELECTRONIC DEVICE HAVING IMPACT DETECTING FUNCTION

(71) Applicant: FANUC CORPORATION, Minamitsuru-gun, Yamanashi (JP)

(72) Inventors: Junichi Oouchi, Yamanashi (JP); Kenichi Ito, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 101 days.

(21) Appl. No.: 15/260,406

(22) Filed: Sep. 9, 2016

(65) Prior Publication Data
US 2017/0074899 A1    Mar. 16, 2017

(30) Foreign Application Priority Data
Sep. 10, 2015    (JP) .................................. 2015-178288

(51) Int. Cl.
*G01P 15/00* (2006.01)
*G01P 15/04* (2006.01)
(Continued)

(52) U.S. Cl.
CPC ............ *G01P 15/0802* (2013.01); *G01P 1/07* (2013.01); *G01P 15/04* (2013.01);
(Continued)

(58) Field of Classification Search
CPC .................................................. G01P 15/0891
See application file for complete search history.

(56) References Cited

U.S. PATENT DOCUMENTS

| 4,055,842 A | 10/1977 | Yakshin et al. |
| 7,979,235 B2 * | 7/2011 | Pasolini .................. G01P 1/006 360/75 |

(Continued)

FOREIGN PATENT DOCUMENTS

| CN | 1781658 A | 6/2006 |
| CN | 1837829 A | 9/2006 |

(Continued)

OTHER PUBLICATIONS

Decision to Grant a Patent for Japanese Application No. 2015-178288, dated Sep. 19, 2017, including English translation, 6 pages.

(Continued)

*Primary Examiner* — Herbert K Roberts
(74) *Attorney, Agent, or Firm* — RatnerPrestia

(57) ABSTRACT

An electronic device is installed in a machine where there is a possibility in occurrence of vibration or impact. The electronic device includes an acceleration detecting unit detecting acceleration in a predetermined time interval, and an impact determining unit. In a case where it is determined that an acceleration value exceeds a predetermined first threshold value, a second threshold value is calculated based on a maximum value among acceleration values of plural accelerations for a predetermined time interval after the determination. In a case where the number of accelerations where acceleration values exceeds the second threshold value among the plural accelerations is a predetermined number or less, the impact as a single-type impact is determined. In a case where the number exceeds the predetermined number, the impact as a multiple-type impact is determined. Also included is an output unit outputting a signal in a case where the impact is determined as the multiple-type impact.

2 Claims, 4 Drawing Sheets

(51) Int. Cl.
    *G01P 15/08*    (2006.01)
    *G01P 1/07*     (2006.01)
    *G05B 19/406*   (2006.01)
    *G01P 15/18*    (2013.01)
    *G05B 19/4065*  (2006.01)

(52) U.S. Cl.
    CPC .......... *G01P 15/0891* (2013.01); *G01P 15/18* (2013.01); *G05B 19/406* (2013.01); *G05B 19/4065* (2013.01); *G05B 2219/37351* (2013.01)

(56) References Cited

U.S. PATENT DOCUMENTS

| | | | |
|---|---|---|---|
| 2006/0184256 A1 | 8/2006 | Iwashita et al. | |
| 2009/0205406 A1* | 8/2009 | Tachibana | G01P 15/0891 73/12.06 |
| 2014/0262392 A1* | 9/2014 | Petrossians | G01M 1/22 173/20 |
| 2014/0266751 A1* | 9/2014 | Shepherd | G01P 15/0891 340/665 |
| 2014/0285333 A1* | 9/2014 | Imamura | B60L 11/1851 340/436 |
| 2015/0352679 A1 | 12/2015 | Yamamoto et al. | |

FOREIGN PATENT DOCUMENTS

| | | |
|---|---|---|
| CN | 103303453 A | 9/2013 |
| DE | 2558172 A1 | 7/1976 |
| JP | 2009080752 A | 4/2009 |
| JP | 2009142941 A | 7/2009 |
| JP | 2010122035 A | 6/2010 |
| JP | 2010205082 A | 9/2010 |
| JP | 2014026477 A | 2/2014 |
| JP | 2014172107 A | 9/2014 |
| JP | 2014-215184 A | 11/2014 |
| JP | 2014209086 A | 11/2014 |

OTHER PUBLICATIONS

Chinese Office Action for Chinese Application No. 2016108151827, dated Jul. 13, 2018 with translation, 14 pages.

German Examination Report for German Application No. 10 2016 010 813.4, dated Jan. 9, 2019, with translation, 8 pages.

* cited by examiner

ELECTRONIC DEVICE HAVING IMPACT DETECTING FUNCTION

BACKGROUND OF THE INVENTION

1. Field of the Invention

The present invention relates to an electronic device, and more particularly, to an electronic device having an impact detecting function.

2. Description of the Related Art

When an impact is repeatedly applied through a machine casing to an electronic device, damage may be accumulated in electronic parts mounted on the electronic device or solder portions thereof, and thus, the electronic parts are destructed or the solder portion are broken, so that the electronic device may lead to failure. During the time interval from the occurrence of failure to the restoration, a machine tool cannot perform processing, and the utilization rate is lowered, a user experiences disadvantages.

Therefore, if an impact which is considered to cause failure can be detected and a worker or an equipment maintenance person can be prompted to change a processing condition, take measures to the impact of the machine tool itself, or improve a machine operating method, or the like, an operating time can be extended, and rapid restoration at the time of failure can be made by advance preparation of replacement parts, so that the utilization rate of the machine tool can be improved.

As impact generating factors, there are (1) an improper machining program causing an impact between a workpiece and a tool, (2) an improper processing condition such as discordance between a feed speed of the workpiece and a rotation speed of the tool, (3) a user's operation of the machine, and the like. With respect to the generating factors (1) and (2), improvement can be made by performing processing simulation using CAM software of a PC or the like before the performing of actual processing. However, with respect to the generating factor (3), prediction is difficult.

Among the aforementioned generating factors, as the generating factor (3) caused by the user's operation, exemplified is impact generation according to an operation of an electronic device itself or a device attached in the vicinity thereof, for example, pressing a button attached to the electronic device or opening/closing of a cover attached to the electronic device, or an operation of moving a safety door attached to the machine tool or an operation panel pendant attached with a controller.

The type of impact is different according to the generating factor, and in a case where the operation of opening/closing of the door or the operation of moving the operation panel pendant is the generating factor, since the entire casing of the machine tool is vibrated, members of the casing collide each other several times, so that a multiple-type impact is generated. On the other hand, in a case where the operation of the button or the operation panel is the generating factor, since only the electronic device itself or only the installed portion thereof is vibrated, the members of the casing collide with each other once, so that a single-type impact is generated. When two impacts having the same maximum values of acceleration are considered, the multiple-type impact applies stronger stress to the electronic device than the single-type impact.

In the related art, well-known is a method of mounting an acceleration sensor on an electronic device, detecting an impact after free fall or fall or both impacts thereof, and display warning to stop the device or record in maintenance information. Particularly, since a mobile electronic device is configured in a form that the electronic device is used while being carried, in a well-known method, a certain level of impact protection mechanism is provided, so that an impact capable of causing failure is detected.

In addition, for example, JP 2014-215184 A discloses a technique of measuring a free fall time and a convergence time of an impact observed after the free fall, comparing the time with an allowable convergence time every predefined free fall time to determine whether or not a certain impact is applied, by using an acceleration sensor.

However, only if the magnitude of the impact is identified and warning is issued based on a certain threshold value by using a mounted acceleration sensor, even in the case of the aforementioned small stress, a single-type impact is also detected, and in a normal operation, warning is frequently issued, so that user's convenience is impaired.

In addition, in a stationary-type electronic device such as a numerical controller which can be installed in a machine tool, free fall does not occur, and thus, the free fall time as a reference of determination of the impact does not exist, so that there is a problem in that it is difficult to identify and detect a degree or type of the impact.

SUMMARY OF THE INVENTION

The invention is to provide an electronic device being mounted on a machine tool and being capable of identifying a type of an impact applied from an outside to the electronic device.

In the invention, a multiple-type impact causing a large stress by which the entire casing is vibrated and a single-type impact causing a small stress by which only the vicinity of the electronic device is vibrated are identified based on the number of times of impact, in the former case, warning is issued, and in the latter case, warning is not issued, so that a utilization rate of the machine tool can be improved without impairing user's convenience.

According to an aspect of the invention, there is provided an electronic device installed in a machine where there is a possibility in occurrence of vibration or impact, including: an acceleration detecting unit detecting acceleration in a predetermined time interval; an impact determining unit, in a case where it is determined that an acceleration value of acceleration detected by the acceleration detecting unit exceeds a predetermined first threshold value, calculating a second threshold value based on a maximum value among acceleration values of plural accelerations detected by the acceleration detecting unit for a predetermined time interval after the determination, in a case where the number of accelerations where acceleration values exceeds the second threshold value among the plural accelerations is a predetermined number or less, determining the impact as a single-type impact, and in a case where the number exceeds the predetermined number, determining the impact as a multiple-type impact; and an output unit outputting a signal in a case where the impact is determined as the multiple-type impact.

The electronic device may further include a communication unit communicating with an outside, in which the communication unit automatically transmits information stored in the electronic device to the outside in a case where the number determined as the multiple-type impact exceeds the predetermined number.

According to the invention, a type of an impact applied from an outside to an electronic device such as a numerical controller installed to an machine tool can be distinguished to be detected, a user of the machine tool or a machine manufacturer can be warned of a possibility of failure or can be required to take measures to the impact based on the impact involved with failure.

BRIEF DESCRIPTION OF THE DRAWINGS

The above-described objects of the invention and other objects and features will be clarified from the description of hereinafter embodiments with reference to the attached drawings including.

DETAILED DESCRIPTION OF THE PREFERRED EMBODIMENTS

Hereinafter, embodiments of the invention will be described with reference to the drawings.

Figure 1:
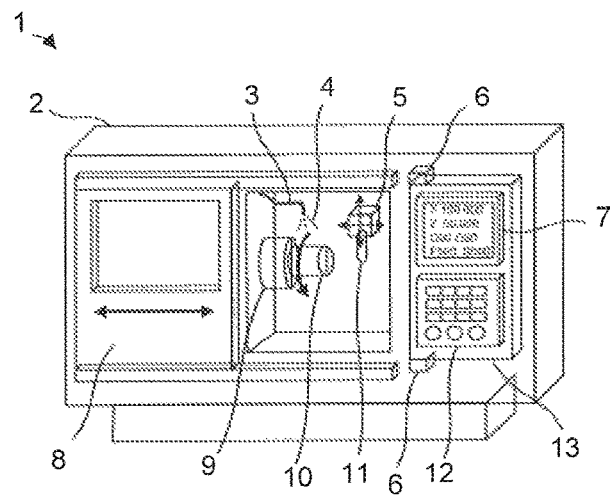
FIG. 1 is a schematic configuration diagram illustrating a machine tool equipped with an electronic device according to an embodiment of the invention.

FIG. 1 illustrates a configuration example of a lathe-type machine tool of rotating a workpiece attached to a main axis and cutting the workpiece by a tool attached to a tool rest to form, a desired shape. The machine tool 1 is configured to include a main axis 9 and a workpiece 10 which are rotated by a motor, a tool rest 5 which holds a tool 11 and is controlled by a machining program, a nozzle 3 which injects a cutting liquid 4 for facilitating discharging of cutting chips (generated in machining and reducing influence of thermal expansion caused by friction, a machine operation panel 12 which includes various operation switches, and an operation panel pendant. 13 which is equipped with an electronic device (hereinafter, referred to as a numerical controller 7) for controlling the main axis 9, the tool rest 5, and peripheral devices.

As well known, the numerical controller 7 is configured to include an arithmetic processing unit, an input/output interface, a storage device such as DRAM or non-volatile memories, a display which performs displaying various types of information, and an operating unit to which perform inputting various types of data. Although not shown in the figures, connectors which are used for connecting an external device such as a USB memory and is exposed to the outside of the machine and, for example, an operation start button or the like which may cause danger if the button is inadvertently operated are provided to the numerical controller 7 and the machine operation panel 12. A protective cover is provided to these components in order to prevent extraneous matters such as cutting liquid or metal powder from being attached with respect the former and to prevent the button from being inadvertently pressed with respect to the latter.

The machine tool 1 is surrounded by a casing (hereinafter, referred to as a machine casing 2) which is typically configured with a metal plate in order to separate a person from a processing area as a dangerous area where a movable portion exists and in order to allow cutting chips or cutting liquid scattered by processing not to leak to the outside. In addition, in order to perform attachment and detachment of the workpiece 10, a door 8 which is manually or automatically openable and closable is provided to the machine casing 2. The door 8 is openable and closable by sliding in a horizontal direction (arrow direction illustrated in FIG. 1). Alternatively, the door may be openable and closable by sliding in a vertical direction or in a forward or depth direction.

A user performs processing by inputting a machining program produced based on a design drawing of the workpiece to the numerical controller 7, by inputting a machining program automatically produced by a CAD/CAM system to the numerical controller 7, or by transmitting a machining program stored in an external device to the numerical controller 7 via external communication means such as Ethernet (registered trade mark) or RS232-C as needed. The numerical controller 7 controls a rotation speed of the main axis 9 or the tool rest 5 based on the machining program. In addition, various tasks such as adjustment of processing conditions such as a rotation speed of the main axis 9 and a feed speed of the tool rest 5, attachment or detachment of the workpiece 10, measurement or setting of position and size of the workpiece 10, and measurement of size of the tool 11 are performed by operating the numerical controller 7 attached to the operation panel pendant 13 or the machine operation panel 12.

Figure 2:
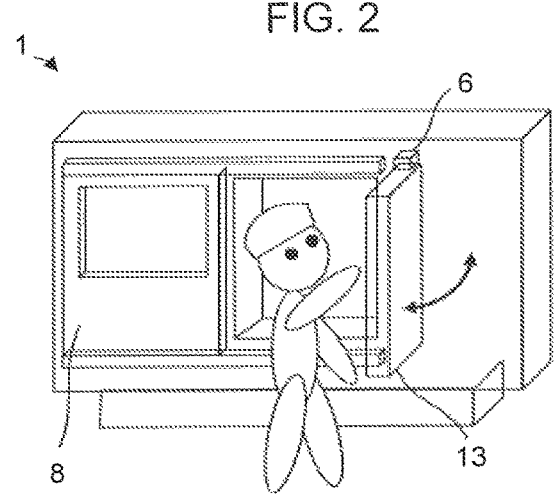
FIG. 2 is a diagram illustrating a state that the machine tool according to the embodiment of the invention is operated.

FIG. 2 is a diagram illustrating a state that an operator operates the numerical, controller or the machine operation panel. As illustrated in FIG. 2, in many case, the operator operates the numerical controller 7 or The machine operation panel 12 at a position, where the operator can see the inner portion of the processing area. Therefore, in many cases, the operation panel pendant 13 is configured in a movable type. In the machine tool 1 according to the embodiment, the operation panel pendant 13 is configured so that the operation panel pendant can change the direction in the arrow direction in the figure through a hinge 6 attached to the side surface of the operation panel pendant 13.

Figure 3:
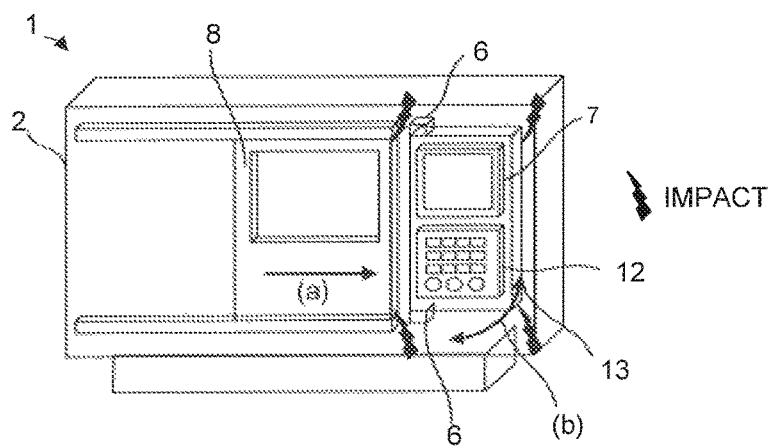
FIG. 3 is a diagram illustrating impact occurring in the machine tool according to the embodiment of the invention.

In the above-described task, at the time of performing the operation of opening or closing the door 8 or the position operation of the operation panel pendant 13, in a case where force adjustment of the operator is not appropriate, as illustrated in FIG. 3, in some cases, due to (a) collision between the door 8 and the machine casing 2 or (b) collision between the operation panel pendant 13 and the machine casing 2, a large force, that is, acceleration is applied to the numerical controller 7 on the operation panel pendant 13. In order to prevent such acceleration from being generated, generally, for example, a cushion configured with an elastic member such as a rubber or an impact adsorption mechanism such as an air damper or an oil damper is attached to the door 8 or an opening/closing mechanism of the operation panel pendant 13. In this case, if an impact exceeding a rated impact of the impact absorption mechanism is applied, or if characteristics are deteriorated due to long-term use so that the impact absorption mechanism cannot be used for impact absorption, large impact may be generated. Particularly, in some cases, the elastic member such as a rubber is hardened according to a component of the cutting liquid used for the machine tool 1 to lose cushion property. In addition, in some case, originally, any impact absorption mechanism is not provided to the machine tool 1. Due to the impact generated by this factor, the operation panel pendant 13 or the entire machine casing 2 are in a vibrating state, and it is observed in an acceleration waveform detected by an acceleration detecting unit that multiple times of impacts are likely to be generated (multiple-type impact).

On the other hand, although operation of a button provided to the machine operation panel 12 or the numerical controller 7 or opening or closing of the protective cover is also likely to generate large acceleration according to force adjustment of the operator, since only the numerical controller 7 itself or only the vicinity of the machine operation panel 12 is in a vibrating state, the acceleration waveform observed by the above-described unit becomes a waveform of a single-type impact (single-type impact).

As described above, since the number of impacts applied is different according to the generating factor, stress to components provided in the numerical, controller 7 is also different. In a case where acceleration having the same maximum value of strength is considered, although a single-type impact generated due to operation of the machine operation panel 12 or the numerical controller 7 as the generating factor does not become a failure factor of the numerical controller 7, if the impact is detected and a detection signal is output, there is a possibility that warning based on the detection signal frequently occurs every time of the operation, so that user's convenience is impaired. Therefore, in the invention, by distinguishing the detection signal based on the acceleration generated due to the opening/closing operation of the door 8 or the position operation of the operation panel pendant 13 as the generating factor and the detection signal based on the acceleration generated due to the operation of the numerical controller 7 or the machine operation panel 12 as the generating factor, frequent warning involved with the latter operation is prevented, and thus, user's convenience is ensured.

In an embodiment of the invention, warning may be configured to be issued based on only the detection signal based on the acceleration generated due to the opening/closing operation of the door 8 or the position operation of the operation panel pendant 13 as the generating factor. In this case, as the warning, visual means of a method of displaying a warning text or a caution symbol or figure on a screen of the numerical controller 7 or a method flashing a lamp attached to the machine tool 1 is considered, and besides, notification or the like using sound such as a warning sound of a buzzer or the like or a voice message is considered. In audition, in another embodiment statistic information on the number of times of or the frequency of outputting of each of the detection signal based on the acceleration generated due to the opening/closing operation of the door 8 or the position operation of the operation panel pendant 13 as the generating factor and the detection signal based on the acceleration generated due to the operation of the numerical controller 7 or the machine operation panel 12 as the generating factor may be stored in a memory or the like of the numerical controller 7, and warning may be issued based on the statistic information. In this case, for example, in a case where predetermined times or more of multiple-type impacts are detected during one time of processing task, warning which warns a worker is generated. Even in a case where a single-type impact is detected, if the frequency is too large, warning calling attention is generated. Like this, warning generation can be controlled according to situation.

In addition, if the numerical controller 7 is connected to an external device through communication means such as Ethernet (registered trade mark) or near field communication Bluetooth (registered trade mark), it can be considered that detection signal or warning generation is notified to a remote site, for example, through information transmission means such as an e-mail.

In addition, at the time of acceleration detection or warning generation, if information such as time, machine state (whether to be in set-up state or in an actual machining, or the like), and the accumulated number of acceleration detection and warning generation is also recorded or not fled together, information useful for specifying cause of warning or measures can be obtained. On the other, in a case where measures are not taken despite repeated warning, failure cannot be avoided. In consideration of this possibility, if internal information such as a machining program or setting parameters is automatically saved in a non-volatile memory of the numerical, controller 7 or in an external device via an external network every time of warning generation or every several times of warning generation, the influence of failure generation can be suppressed to a minimum limit, and the information can be useful for subsequent device restoration.

Figure 4:
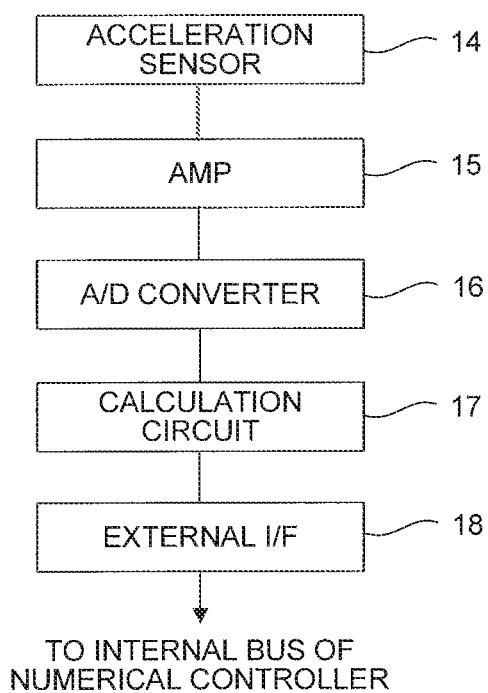
FIG. 4 is a configuration diagram illustrating main components of the electronic device according to the embodiment of the invention.

Hereinafter, specific detection and analysis methods will be described. FIG. 4 is a block diagram illustrating main components of a configuration for detecting impact including an acceleration sensor as an acceleration detecting unit provided to the machine tool 1 and a calculation circuit as an impact determining unit. The acceleration sensor 14 which generates an electric signal if acceleration is applied is provided to the numerical controller 7. As the acceleration sensor 14, well-known techniques using piezoelectric effect or detecting a change in electrical resistance or a resistor are used. However, in the embodiment, since it is preferable that acceleration in horizontal, vertical, and depth directions can be independently detected and output, three-dimensional acceleration sensor is used, or a combination of plural single-axis acceleration sensors may be embodied. In some cases, according to installation method and structure of the numerical controller 7 or the machine operation panel 12, the direction of acceleration may be different between the acceleration given by the generating factor of the impact and the acceleration measured when the impact is propagated to the numerical controller 7. Therefore, it is preferable that the acceleration in the three dimensions can be measured.

With respect to the installation position of the acceleration sensor 14, a position on a printed board constituting the numerical controller 7 or a position on the casing is considered. However, the acceleration sensor 14 needs to be installed at the position where the acceleration applied to the numerical controller 7 can be accurately detected. For this reason, the acceleration sensor 14 is preferably installed at a position were rigidity is high, and in the case of the printed board, a position in the vicinity of a screw is preferred.

Since an output value of the acceleration sensor 14 is very small, an amp 15 which amplifies an output current of a piezoelectric element or a circuit where a voltage according to a resistance value of a resistor is output is connected to the outside of the sensor. A signal output from the circuit is connected to a calculation circuit 17 of performing calculation, buffering, and comparison of absolute values of the acceleration through a lowpass filter (not shown) and an A/D converter 16. The output of the circuit is connected to an internal bus of the numerical controller 7 through an external interface 18.

Figure 5:
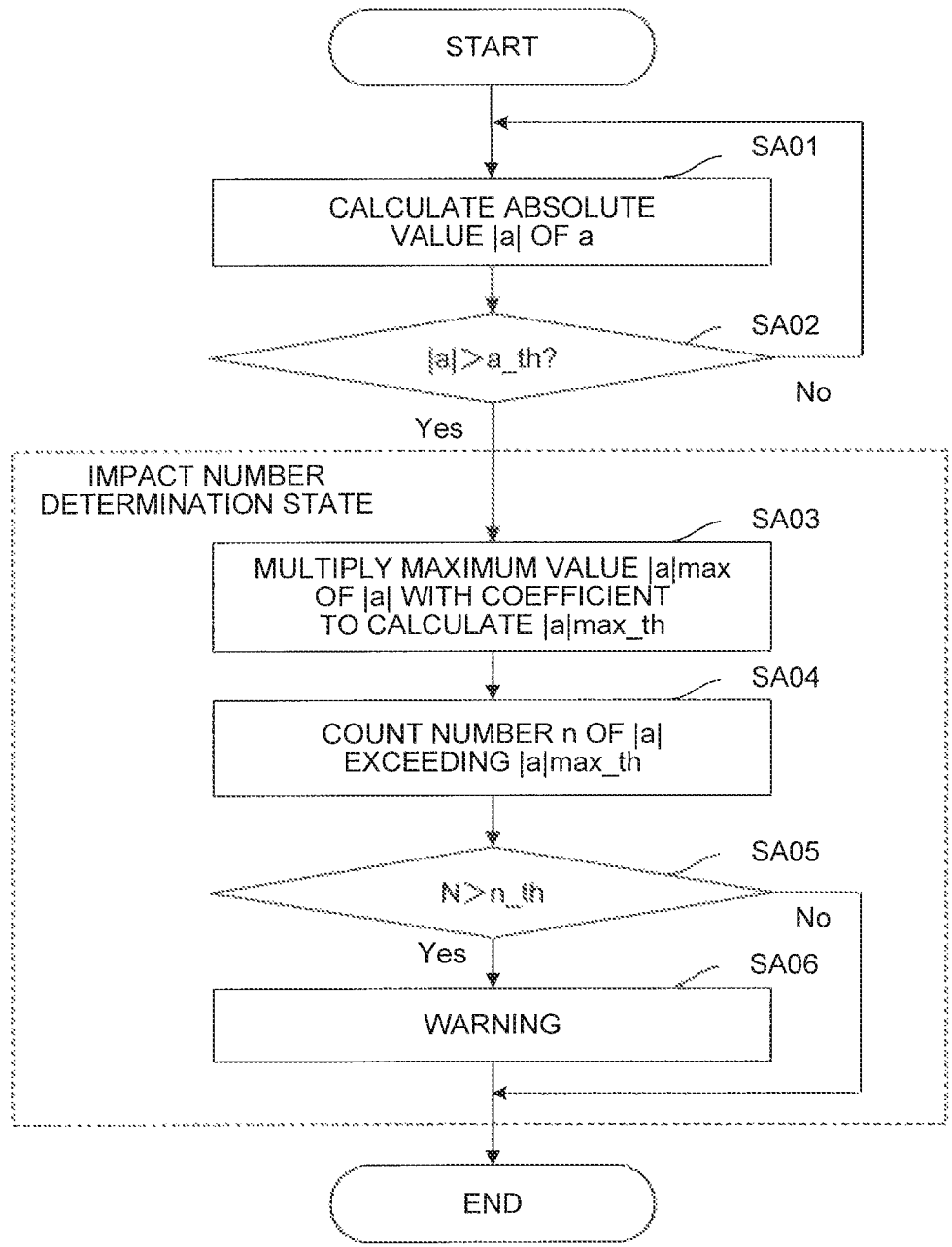
FIG. 5 is a flowchart illustrating processes executed on the electronic device according to the embodiment of the invention.

FIG. 5 is a flowchart illustrating an example of a flow from impact detection to analysis and warning. An output of the acceleration sensor 14 is sampled at an interval of a reference frequency. In the case of a three-axis sensor, three-dimensional data of acceleration a=(ax, ay, az) is acquired. The calculation circuit 17 calculates an absolute value |a| of the acceleration a by using the following Mathematical Formula 1 and stores the absolute value in a register (step SA01).

$$|a|=\sqrt{ax^2+ay^2+az^2}$$ [Math. 1]

Next, the calculation circuit 17 determines whether or not the absolute value |a| of the acceleration a exceeds a regulated threshold value a_th, and in a case where the absolute value exceeds the threshold value, the calculation circuit determines that impact is applied and transitions to an impact number determination state (step SA02).

After the transition to the impact number determination state, the calculation circuit 17 sets a maximum value among n acceleration absolute values |a| calculated from the acceleration a based on the impact detected by the acceleration sensor 14 to be stored as |a|max and calculates |a|max_th which is a value obtained by multiplying the |a|max by a regulated coefficient k (for example, 0.2) (step SA03). Next, among the n acceleration absolute values |a| stored after the transition to the impact number determination state, the calculation circuit counts the number n of |a| having a value exceeding the |a|max_th (step SA04). In a case where n is the number (for example, 20) exceeding the regulated threshold value n_th, the calculation circuit 17 determines multiple-type impact, and in a case where the number is smaller, the calculation circuit determines the single-type impact (step SA05). Next, in a case where the multiple-type impact is determined, warning is issued (step SA06).

Figure 6:
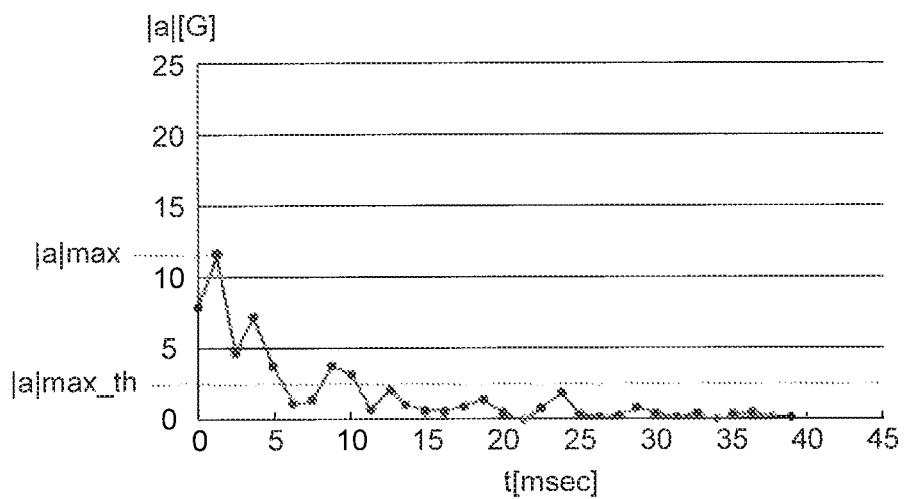
FIG. 6 is a diagram illustrating an example of a single-type impact detected by the electronic device according to the embodiment of the invention.
Figure 7:
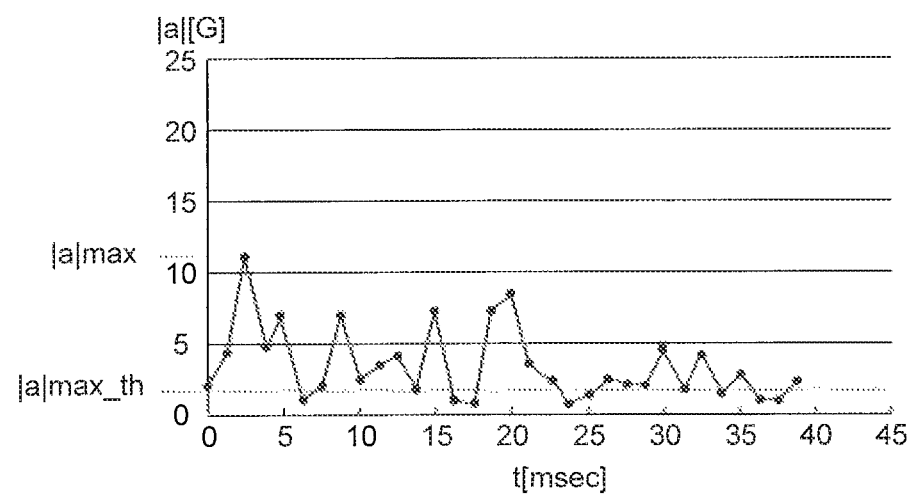
FIG. 7 is a diagram illustrating an example of multiple-type impact detected by the electronic device according to the embodiment of the invention.

FIGS. 6 and 7 are diagrams illustrating examples of the waveform detected by the acceleration sensor. FIG. 6 is an example of the waveform detected when the numerical controller 7 or the machine operation panel 12 is operated. FIG. 7 is an example of the waveform measured in a case where the door 8 of the machine is closed strongly.

The sampling frequency is set to 1.25 msec, the threshold value a_th of the absolute value |a| of the acceleration a in the transition to the impact number determination state is set to 3G, the number n of absolute values |a| of the acceleration a used after the transition to the impact number determination state is set to 32, and the coefficient k of calculation of the |a|max_th used for determination of the number of times of impact is set to 0.2. The calculated |a|max_th is illustrated by a dotted line. The criterion of determination n_th for the number of times of impact is 20. In FIG. 6, since the value of n is 7, warning is not issued. In FIG. 7, since the value of n is 24, warning is issued.

Heretofore, while the embodiments of the invention are described, the invention is not limited to the above-described embodiments, but the invention can be implemented in various forms through appropriate changes.

For example, in the above-described embodiment, the acceleration sensor 14, the amp 15, and the A/D converter 16 are configured as independent devices. However, a well-known electronic part into which these devices are integrated, for example, an MEMS device is useful in terms of reduction in part installation area or reduction in cost.

In the above-described embodiment, although the number of times of impact is determined used on the acceleration absolute value |a|, since the number of times of impact is determined by a simple method such as the maximum value among the n measured values and how many the measured values exceed the threshold value as a regulated multiple thereof, instead of the absolute value |a|, by using a simple value like the sum of magnitudes of acceleration in each of the axes, for example, |ax|+|ay|+|az| in the case of three axes, the same effect can be obtained.

In the above-described embodiment, although each process as the impact determining unit indicated in the flowchart of FIG. 5 is configured to be performed by the calculation circuit 17, the output from the A/D converter may be configured to be output to the numerical controller 7, and each process as the impact determining unit may be configured to be performed on a CPU, a PMC, or the like included in the numerical controller 7. In the case of this configuration, the calculation circuit 17 becomes unnecessary.

In the above-described embodiment, although the acceleration is configured to be detected so that two types of the single-type impact and the multiple-type impact are distinguished, for example, plural threshold values for the number of times of impact may be defined, and thus, the acceleration may be detected in plural divided levels such as a single-type impact, a multiple-type impact, an intermediate impact between the single-type impact and the multiple-type impact, and an impact further exceeding the multiple-type impact, and in each case, the level of warning or the operation of the numerical controller 7 may be configured to be changed.

In addition, although the electronic device according to the invention is described as a form where the electronic device is provided to the lathe-type machine tool, the invention is not limited to the lathe-type machine tool. The invention can be applied to an electronic device provided to a milling-type tool, a complex machine thereof, a grinder, a hobbing machine, a gear sharper, a metal press, a metal being machine, various processing machines for cutting, grinding, bending, and punching, or a machine where there is a possibility in occurrence of vibration or impact.

Heretofore, while the embodiments of the invention are described, the invention is not limited to the above-described embodiments, but the invention can be implemented in other forms through appropriate changes.

The invention claimed is:

1. An electronic device installed in a machine where there is a possibility of occurrence of vibration or impact, comprising:
   an acceleration sensor configured to detect acceleration in a predetermined time interval;
   a processor for controlling an operation of the machine, the processor configured to:
   1) compare an acceleration value of acceleration detected by the acceleration sensor to a predetermined first acceleration threshold value,
   2) in response to determining that the acceleration value detected by the acceleration sensor exceeds the predetermined first acceleration threshold value, calculate a second acceleration threshold value as a fraction of a maximum acceleration value among acceleration values of plural accelerations detected by the acceleration sensor over the predetermined time interval,
   3) compare subsequent acceleration values detected by the acceleration sensor to the second acceleration threshold value, 4) in response to determining that a number of the subsequent acceleration values exceeding the second acceleration threshold value is a predetermined number or less, determine the impact as a single-type impact, and
5) in response to determining that the number of the subsequent acceleration values exceeding the second threshold value exceeds the predetermined number, determine the impact as a multiple-type impact; and an audio output device or a visual output device outputting a signal in response to the processor determining that the impact is the multiple-type impact.

2. The electronic device according to claim 1, further comprising:

a communication unit communicating with an outside, wherein the communication unit automatically transmits information stored in the electronic device to the outside when the processor determines that the impact is the multiple-type impact.

* * * * *